United States Patent [19]

Tokioka et al.

[11] Patent Number: 5,570,299

[45] Date of Patent: Oct. 29, 1996

[54] COORDINATE INPUT APPARATUS, VIBRATION SENSING DEVICE AND METHOD OF EVALUATING SAME

[75] Inventors: Masaki Tokioka, Yokohama; Atsushi Tanaka, Kawasaki; Yuichiro Yoshimura, Kamakura; Kiyoshi Kaneko, Yokohama; Ryozo Yanagisawa, Matsudo; Katsuyuki Kobayashi, Yokohama, all of Japan

[73] Assignee: Canon Kabushiki Kaisha, Tokyo, Japan

[21] Appl. No.: 112,253

[22] Filed: Aug. 26, 1993

[30] Foreign Application Priority Data

Aug. 31, 1992 [JP] Japan ..................... 4-232351

[51] Int. Cl.⁶ ........................... G01B 17/00; G06K 11/14
[52] U.S. Cl. ............................................. 364/560; 178/18
[58] Field of Search ................................. 364/560, 508, 364/561; 178/18; 73/663; 33/1 M

[56] References Cited

U.S. PATENT DOCUMENTS

| 4,665,282 | 5/1987 | Sato et al. ................................ 178/18 |
| 4,931,965 | 6/1990 | Kaneko et al. ........................ 364/560 |

FOREIGN PATENT DOCUMENTS

| 0169538 | 1/1986 | European Pat. Off. . |
| 0423843 | 4/1991 | European Pat. Off. . |
| 1236320 | 9/1989 | Japan . |
| 2130612 | 5/1990 | Japan . |
| 2130614 | 5/1990 | Japan . |
| 2130616 | 5/1990 | Japan . |
| 2125322 | 5/1990 | Japan . |

*Primary Examiner*—James P. Trammell
*Assistant Examiner*—M. Kemper
*Attorney, Agent, or Firm*—Fitzpatrick, Cella, Harper & Scinto

[57] ABSTRACT

Vibration applied to a tablet is sensed by a sensor provided on the tablet and a time delay from generation of the vibration to the sensing thereof is measured, whereby distance from the vibration source to the sensor can be measured. If the vicinity of the leading edge of the envelope of registration is sensed when sensing the vibration, the effects of reflected waves from the periphery of the tablet are reduced. To this end, the envelope is differentiated to detect an inflection point. The peak gain frequency of the differentiating circuit is greater than the frequency of vibration generated by the vibration source. As a result, the phase of the output signal produced by the differentiating circuit is advanced by about $\pi/2$ with respect to the phase of the input signal, thereby making it possible to sense vibration more quickly.

13 Claims, 9 Drawing Sheets

$f_c = 1/2\pi \, C_1 \cdot R_2$
$f_H = 1/2\pi \, C_1 \cdot R_1 = 1/2\pi \, C_2 \cdot R_2$

COORDINATE INPUT APPARATUS, VIBRATION SENSING DEVICE AND METHOD OF EVALUATING SAME

BACKGROUND OF THE INVENTION

1. Field of the Invention

This invention relates to a coordinate input apparatus. More particularly, the invention relates to a coordinate input apparatus in which vibration generated by an vibration pen is sensed by vibration sensors provided on an vibration transmitting panel so that coordinates designated by the vibration pen may be sensed. The invention further relates to a vibration sensing device and a method of evaluating the device.

2. Description of the Related Art

Ordinarily, in an apparatus of this type, the times required for the vibration generated by the vibration pen to reach vibration sensors provided at prescribed positions of the vibration transmitting panel are measured, and the distances from the vibration pen to the vibration sensors and, hence, the coordinates designated by the vibration pen, are calculated based upon the measured values.

In order to indicate that vibration has reached a vibration sensor, it is necessary to produce a timing signal, which indicates the arrival of vibration at the vibration sensor, from the signal generated by the vibration sensor upon detection of vibration. The main processor that supervises the apparatus receives the vibration-arrival timing signal that is based upon the detection of vibration by each vibration sensor. In response to reception of the timing signal, the main processor completes the measurement to arrival of the vibration and executes the calculation of coordinates.

How to generate this timing signal is a problem. The practice used to generate the timing signal in the prior art is to measure either a transmission lag time that corresponds to the group velocity of vibration or a transmission lag time that corresponds to group velocity and phase velocity. In any case, in order to perform an accurate measurement of transmission lag time that corresponds to the group velocity, the envelope of a signal waveform sensed in the vibration sensor is produced, the peak position or inflection-point position of the envelope is detected and a timing signal is produced based upon the position detected. The envelope is differentiated in order to produce the timing signal corresponding to the peak position. In order to produce the timing signal corresponding to the inflection point, the envelope is subjected to differentiation processing twice. The period of time from the timing at which vibration is generated by the vibration pen to the initial zero-cross point of the first-order differentiated waveform or second-order differentiated waveform is measured as the transmission lag time of vibration.

Detection of the inflection point (second-order differentiation) is preferred over detection of the peak position (first-order differentiation) of the envelope because the position of the inflection point is located ahead of the peak position on the time axis. If unnecessary reflected waves from, say, the end face of the vibration transmitting panel should happen to become superimposed directly on the sensed waves with a slight offset, the earlier detected point is less susceptible to the effects of the reflected waves. If the earlier detected point is adopted, therefore, the vibration transmitting panel and, hence, the apparatus itself, can be made small in size.

It was considered that the circuitry for performing the above-mentioned differentiation demonstrates the same differentiation processing performance (an advance of $\pi/2$ in the phase of the output with respect to an input sinusoidal wave) with regard to input signals having a frequency less than a certain determined frequency fh. For this reason it was preferred that the frequency fh be higher than the frequency of the leading-edge portion of the envelope. Furthermore, it was so arranged that the frequency at which the amplification factor of the differentiating circuit becomes 0 dB (unity gain) is made to agree with the frequency of the envelope waveform so that there will be no change in the input/output amplitude ratio of the differentiating circuit.

However, a problem which arises is that the differentiation characteristic, i.e., the transmission phase characteristic, of the differentiating circuit is such that, in actuality, there is a phase advance of $\pi/2$ with respect to a signal whose frequency f satisfies the relation f<<fh, with the amount of advance in phase becoming gradually smaller as f increases and approaches fh. Consequently, the zero-cross point of the first-order differentiated waveform does not necessarily correspond to the peak of the input signal (envelope), nor does the zero-cross point of the second-order differentiated waveform necessarily correspond to the inflection point of the input signal.

In other words, with regard to the point of detection of vibration corresponding to the group velocity of vibration, no evaluation is made to determine the particular position on the envelope waveform to which this point corresponds before the envelope waveform is differentiated. The reason for this is that when differentiation processing is performed by the differentiating circuit, the peak position of the envelope is judged to be the detection point (the first zero-cross point of the differentiated signal) when this position is detected in the first order differentiation whereas the inflection point is judged to be the detection point when this point is detected in the second order differentiation. In seeking the vibration detection point in accordance with a detection-point evaluation method, described below, the inventors have clarified that even though detection of the inflection point of the envelope is intended by second order differentiation, in actuality all that is detected is the proximity of the peak position. As a consequence, vibration sensed by the vibration sensors is strongly influenced by reflected waves from the edge of the vibration transmitting panel, as a result of which errors in coordinate detection cannot be reduced.

Another problem is that when the advance in phase caused by differentiation is less than $\pi/2$, the zero-cross point of the differentiated waveform is shifted back and forth along the time axis owing to a fluctuation in the level of the input signal. More specifically, when the detection level at a vibration sensor fluctuates owing to distance from the vibration pen or a change in input writing pressure applied to the pen, the measured value of transmission lag time changes. This leads to erroneous detection of coordinates.

SUMMARY OF THE INVENTION

Accordingly, an object of the present invention is to provide a coordinate input apparatus in which coordinate detection error due to the effects of reflected waves is diminished to make possible accurate entry of coordinates.

According to the present invention, the foregoing object is attained by providing a coordinate input apparatus for entering a designated coordinate position, comprising a vibration source for generating vibration, vibration transmission means for transmitting the vibration, a plurality of vibration sensing means for sensing vibration transmitted by the vibration transmission means, generating means for generating an envelope signal of vibration detected by the vibration sensing means, envelope detecting means for detecting a prescribed point in the envelope signal, measuring means for measuring time from entry of the vibration from the vibration source to the vibration transmitting means to detection of the prescribed point by the detecting means, and calculating means for calculating position of the vibration source in the vibration transmission means based upon the time measured by the measuring means.

The envelope detecting means preferably has a differentiating circuit in which a frequency the same as or higher than that of the vibration generated by the vibration source is adopted as peak gain frequency.

Another object of the present invention is to provide a vibration detecting device.

The foregoing object is attained by providing a vibration sensing device comprising generating means for generating an envelope of vibration to be sensed, a differentiating circuit in which peak gain frequency is higher than a frequency of the vibration to be sensed, and means for detecting a zero-cross point of a signal resulting from at least a single differentiation of the envelope by the differentiating circuit.

A further object of the present invention is to provide a method of evaluating a vibration sensing device.

According to the present invention, the foregoing object is attained by providing a method of evaluating a vibration sensing device that detects vibration transmitted through a vibration transmitting panel, in which the vibration transmitting panel has one vibration reflecting surface and a fixed vibration sensor, the method comprising an entry step of entering vibration between the reflecting surface and the vibration sensor, a sensing step of sensing vibration by the vibration sensor, a measuring step of measuring time from entry of the vibration to sensing of the vibration by the vibration sensor, a step of repeating the entry step, sensing step and measuring step while changing a position at which vibration is entered, and a step of judging influence of reflected waves based upon the position at which the vibration was entered and the time up to detection of this vibration.

By virtue of the arrangement described above, an envelope in which vibration of the frequency of the vibration source is strongly suppressed by a higher-order filter is produced from vibration sensed by a sensor, the envelope is differentiated by a differentiating circuit whose peak gain frequency has been set to be higher than the vibration frequency of the vibration source, thereby obtaining an output signal, the phase whereof is advanced by 90°, while suppressing vibration of the vibration frequency. The time from generation of vibration by the vibration source to the zero-cross point of the above-mentioned output signal is measured. As a result, the coordinate input apparatus of the present invention diminishes coordinate detection error ascribable to the effects of reflected waves, thereby making it possible to enter coordinates in an accurate manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Figure 1:
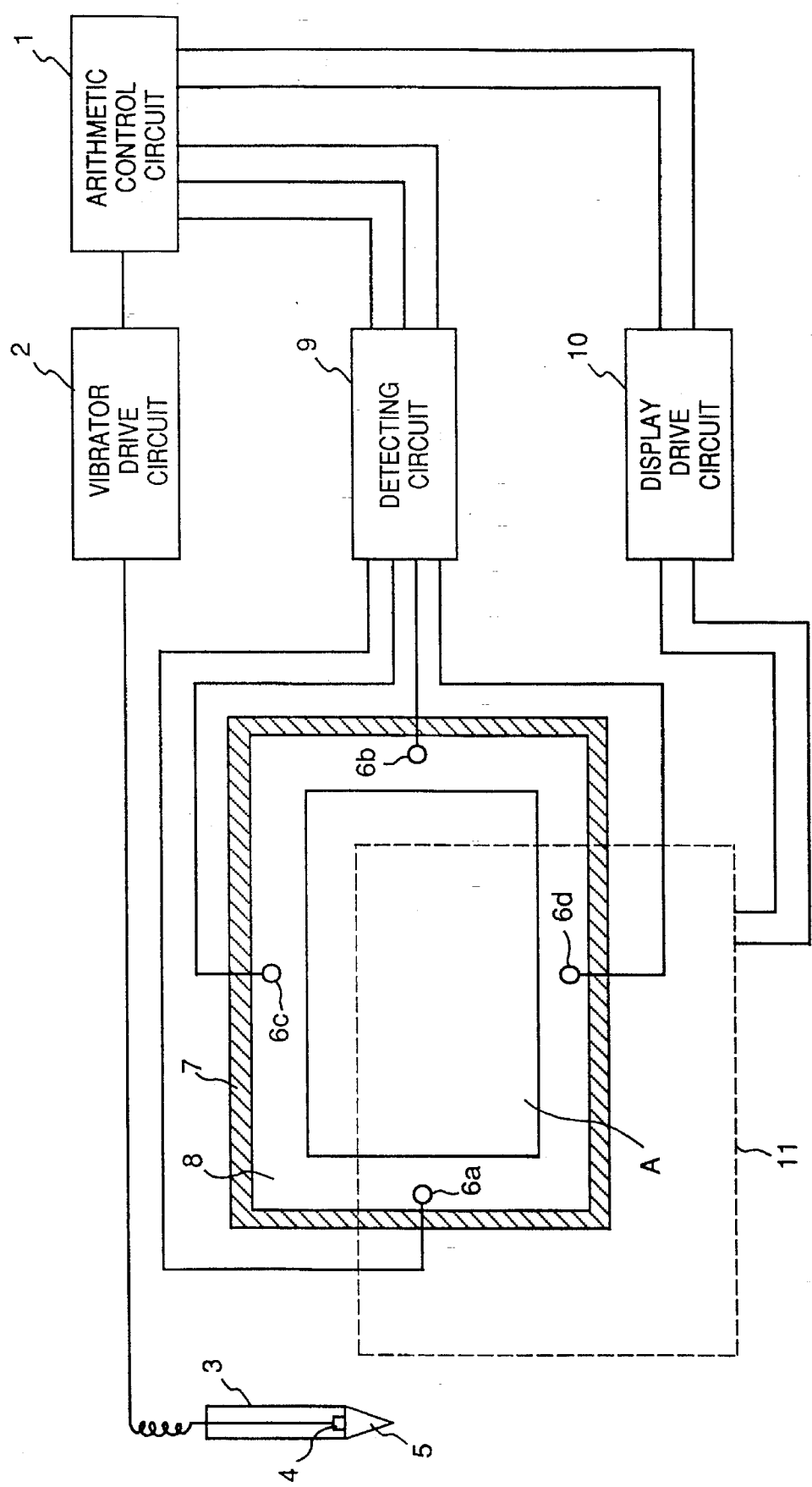
FIG. 1 is a diagram for describing the general features of a coordinate input apparatus according to an embodiment of the present invention.

FIG. 1 illustrates the structure of a coordinate input apparatus according to an embodiment of the present invention. As shown in FIG. 1, an arithmetic control circuit 1 controls the overall apparatus and calculates coordinates. A vibrator drive circuit 2 drives a vibrator 4 so as to vibrate the tip 5 of a vibration pen 3. A tablet 8 comprises a transparent member consisting of an acrylic or glass plate and serves to transmit vibration, which is applied by the vibration pen 3, to sensors. A coordinate input is performed by bringing the vibration pen 3 into contact with the vibration transmitting tablet 8. More specifically, the interior of an area (effective area) A, which is indicated by the solid line in FIG. 1, is designated by the operator using the vibration pen 3, whereby the vibration generated by the vibration pen 3 is applied to the tablet 8. The applied vibration is measured and processed, whereby the positional coordinates of the vibration pen 3 are capable of being calculated.

Waves that have propagated through the vibration transmitting tablet 8 are reflected at the end face of the tablet 8. In order to prevent these reflected waves from returning to the central portion of the tablet (or to reduce such return), a vibration suppresser 7 is provided on the outer periphery of the vibration transmitting tablet 8. As illustrated in FIG. 1, vibration sensors 6a~6d, such as piezoelectric elements, for converting mechanical vibration into electrical signals are secured to the tablet on the inner side of the vibration suppresser 7 and in close proximity thereto. A detecting circuit 9 outputs signals, which have been sensed by each of the vibration sensors 6a~6d, to the arithmetic control circuit 1. A display 11 such as a liquid-crystal display device is capable of presenting a display in dot units and is disposed in back of the vibration transmitting tablet 8. The display 11 is driven by a display drive circuit 10 and displays dots at positions traced by the vibration pen 3. The operator is capable of seeing the display 11 through the vibration transmitting tablet 8 (which is transparent).

The vibrator 4 housed within the vibration pen 3 is driven by the drive circuit 2. The drive signal of the vibrator 4 is supplied from the arithmetic control circuit 1 as a low-level pulse signal. This signal is amplified at a prescribed gain by the vibrator drive circuit 2, after which the amplified signal is applied to the vibrator 4 The electrical drive signal is converted into mechanical vibration by the vibrator 4, and the mechanical vibration is transmitted to the tablet 8 via the pen tip 5.

Figure 2:
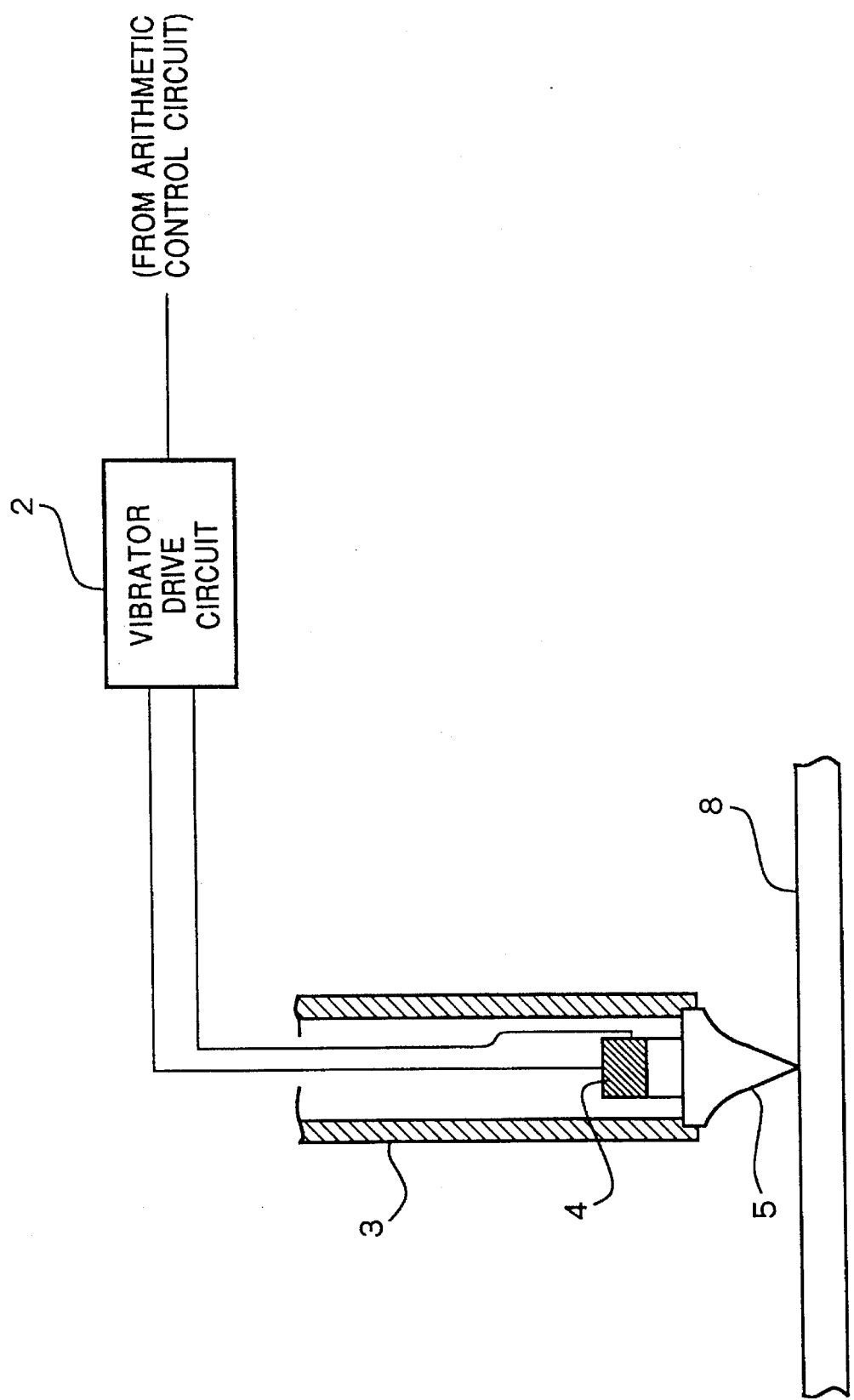
FIG. 2 is a diagram for describing the general features of a vibration pen.

The vibration frequency of the vibrator 4 is selected to have a value capable of generating Lamb waves in the vibration transmitting tablet 8, which consists of glass or the like. When the vibrator is driven, a mode in which the vibrator vibrates in the vertical direction in FIG. 2 with respect to the tablet 8 is selected. Highly efficient conversion of vibration is possible by making the vibration frequency of the vibrator 4 equal to the resonance frequency of the pen tip 5. The elastic waves transmitted through the tablet 8 are Lamb waves, which are advantageous in that they are less susceptible than surface waves or the like to the influence of scratches in the surface of the vibration transmitting tablet, obstacles and the like.

<Description of Arithmetic Control Circuit>

In the arrangement set forth above, the drive circuit 2 of the arithmetic control circuit 1 outputs a signal, which drives the vibrator 4 within the vibration pen 3, at a prescribed period (e.g., every 5 ms). The arithmetic control circuit 1 also starts measurement of time by an internal timer (constituted by a counter). The vibration produced by the vibration pen 3 propagates through the vibration transmitting tablet 8 and arrives at the vibration sensors 6a–6d upon being delayed a period of time commensurate with distance from the vibration source.

The detecting circuit 9 detects the signal from each of the vibration sensors 6a–6d and, by waveform-detection processing described below, generates a detection signal indicative of the timing at which the vibration arrives at each vibration sensor. These signals for each of the sensors enter the arithmetic control circuit 1, which detects the transmission lag time from the vibration pen 3 to each of the vibration sensors 6a–6d and calculates the coordinates of the vibration pen 3. Further, the arithmetic control circuit 1 drives the display drive circuit 10 on the basis of the calculated information indicative of the position of the vibration sensor 3, thereby controlling the display presented by the display 11. Alternatively, the arithmetic control circuit 1 outputs the coordinates to an external unit (not shown) by serial or parallel communication.

Figure 3:
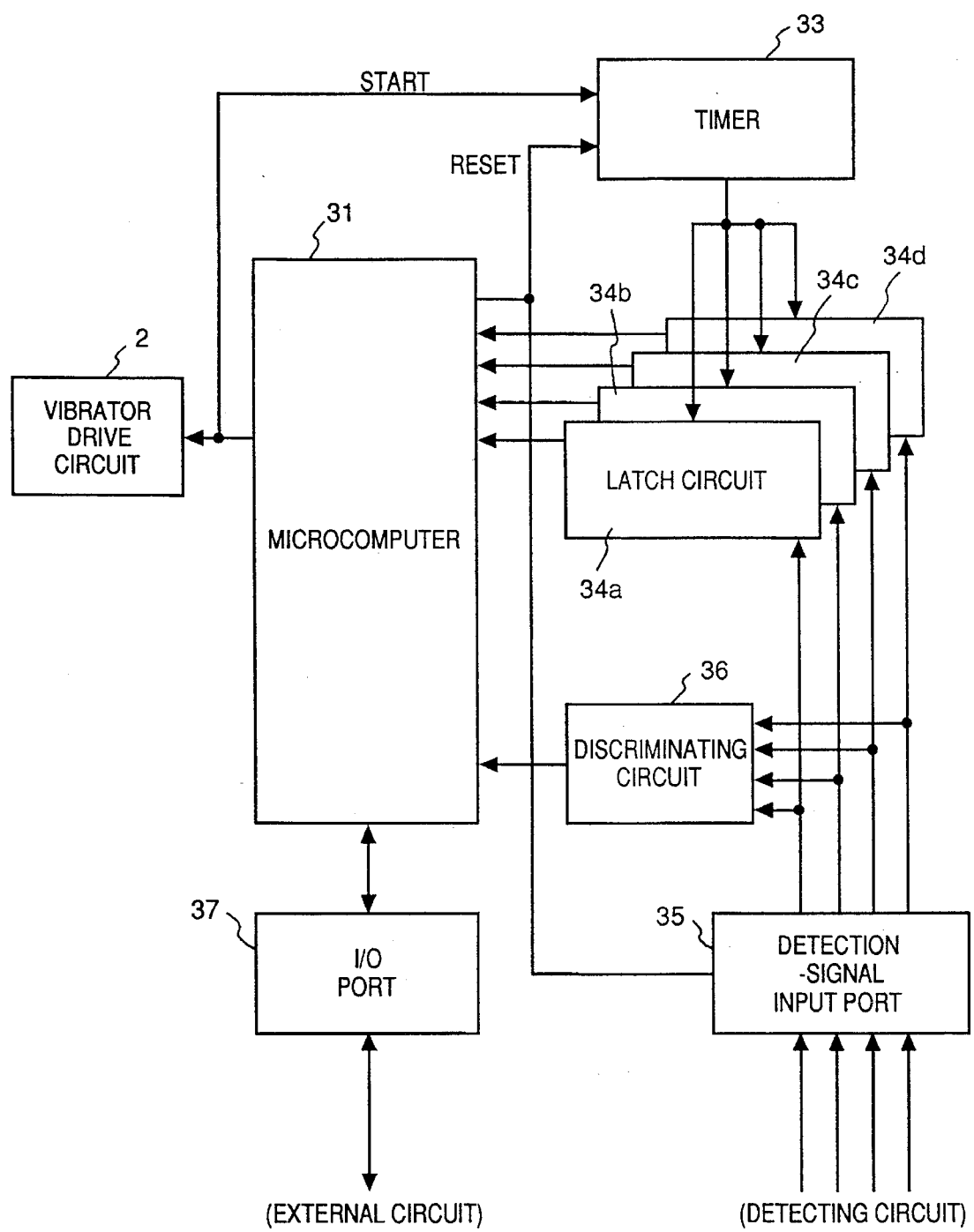
FIG. 3 is a block diagram illustrating the construction of an arithmetic control circuit.

FIG. 3 is a block diagram illustrating the general configuration of the arithmetic control circuit 1 according to this embodiment. The elements of this circuit and the operation thereof will now be described.

As shown in FIG. 3, a microcomputer 31 controls the arithmetic control circuit 1 and the overall coordinate input apparatus. The microcomputer 31 is constituted by an internal counter, a ROM storing the operating procedure, a RAM used in calculations and a non-volatile memory for storing constants and the like. A timer 33 is constituted by a counter, for example, and counts a reference clock (not shown). When the start signal for starting the drive of the vibrator 4 within the vibration pen 3 enters the vibrator drive circuit 2, the timer 33 starts measuring time. As a result, synchronization is established between the start of time measurement and detection of vibration by the sensors, and lag time until detection of vibration by the sensors (6a–6d) is capable of being measured.

Other circuits constructing the apparatus will be described in due course.

The detection signals in the vibration sensor 6a–6d outputted by the signal detecting circuit 9 enter respective latches 34a–34d via a detection-signal input port 35. The latch circuits 34a–34d correspond to the vibration sensors 6a–6d, respectively. When the detection signal in the corresponding sensor is received, the currently prevailing value of time measured by the timer 33 is latched by the particular latch circuit. When a discriminating circuit 36 determines that all of the detection signal have thus been received, the circuit 36 outputs a signal to this effect to the microcomputer 31. In response to reception of the signal from the discriminating circuit 36, the microcomputer 31 reads the transmission lag times from the vibration pen to each of the vibration sensors out of the corresponding latch circuit 34a–34d and performs a predetermined calculation so as to calculate the coordinates of the vibration pen 3 on the vibration transmitting tablet 8. The calculated coordinate information is outputted to the display drive circuit 10 via an I/O port 37, thereby making it possible to display dots or the like at the corresponding position of the display 11. Alternatively, the coordinate information is outputted to an interface circuit via the I/O circuit 37, whereby the coordinate values can be outputted to an external device.

<Description of Detection of Vibration Propagation Time (FIGS. 4, 5)>

The principle through which vibration arrival time with respect to the vibration sensor 3 is measured will now be described.

Figure 4:
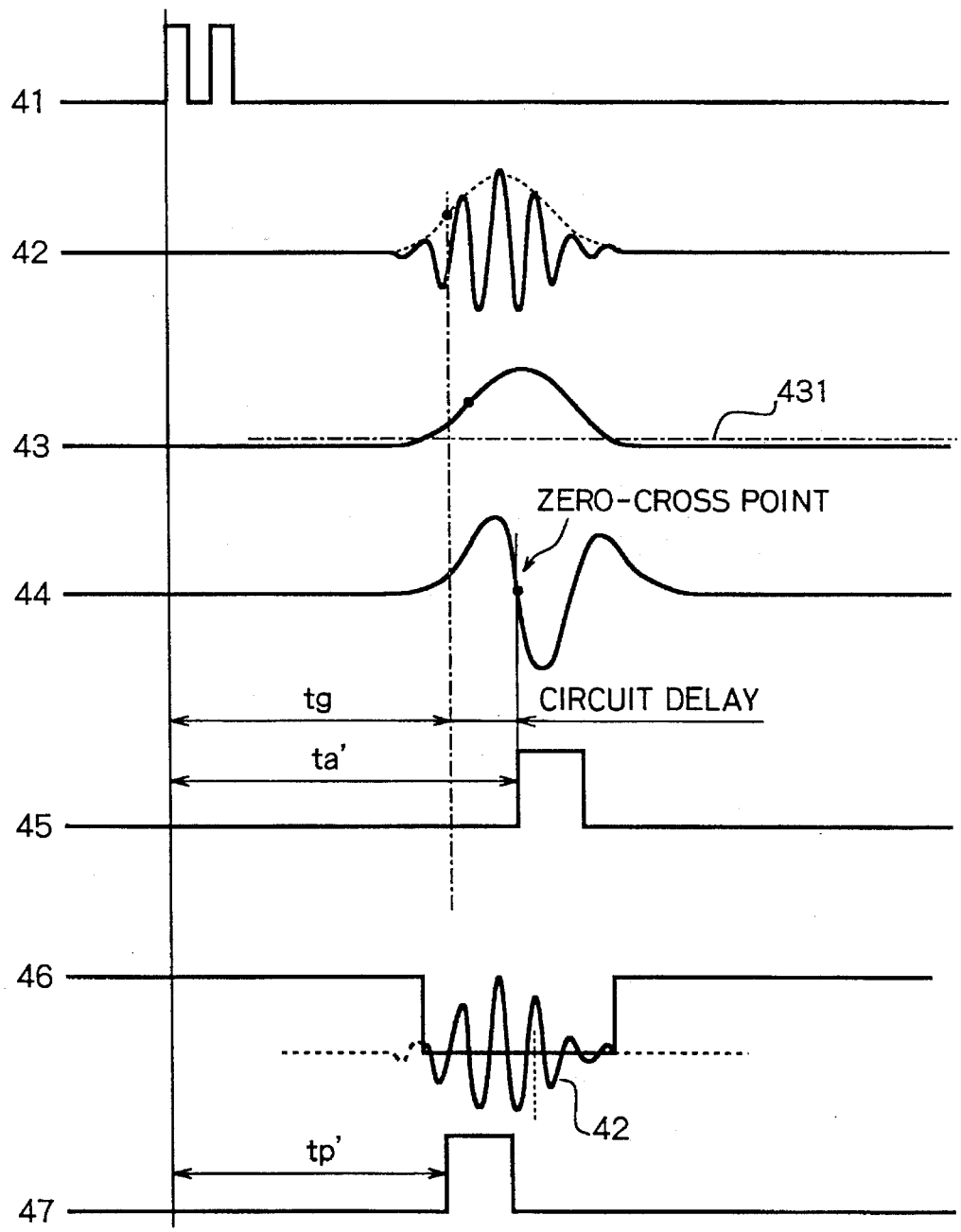
FIG. 4 is a timing chart of signal processing.

FIG. 4 is a diagram for describing signal waveforms that enter the signal-waveform detecting circuit 9 as well as the processing for measuring transmission lag time based upon these waveforms. Though the description relates solely to the vibration sensor 6a, operation is exactly the same with regard to the other vibration sensors 6b, 6c and 6d as well.

The measurement of transmission lag time for transmission of vibrator to the vibration sensor 6a starts at the same time that the start signal is outputted to the vibrator drive circuit 2, as already described. At this time a drive signal 41 from the drive circuit 2 is applied to the vibrator 4. Ultrasonic vibration transmitted from the vibration pen 3 to the vibration transmitting tablet 8 by the signal 41 advances in a period of time tg commensurate with the distance to the vibration sensor 6a, after which the vibration is sensed by the sensor 6a.

Signal 42 in FIG. 4 indicates the signal waveform sensed by the vibration sensor 6a. Since the vibration used in this embodiment is a Lamb wave, the relationship between the envelope 43 of signal 42 and the signal 42 with respect to propagation distance within the vibration transmitting tablet 8 varies in dependence upon the transmission distance. Let Vg represent the speed at which the envelope 43 advances, namely the group velocity, and let Vp represent the phase velocity of the signal 42. The distance between the vibration pen 3 and the vibration sensor 6a can be detected from the group velocity Vg and phase velocity Vp.

First, attention is directed solely to the envelope 43, the velocity of which is Vg. When a point on a certain specific waveform, e.g., a first zero-cross point of a signal 44, which is the second-order differentiated waveform of the envelope 43, is detected as the inflection point of the envelope 43, the distance between the vibration pen 3 and the vibration sensor 6a is given by the following equation, in which the transmission lag time is represented by tg:

$$d = Vg \cdot tg \tag{1}$$

Though this equation relates to the vibration sensor 6a, the distances between the other three vibration sensors 6b~6d and the vibration pen 3 can be similarly expressed by the same equation.

Furthermore, processing based upon detection of the phase signal is executed in order to decide the coordinates more accurately. Let tp represent the time between specific detection points of the phase signal 42, e.g., the time from application of vibration to a zero-cross point after a predetermined signal level 431 (tp is obtained by producing a window signal 46 of a prescribed width from the time at which the envelope 42 exceeds the level 431, and comparing the signal 46 with the phase signal 42). The distance between the vibration sensor and the vibration pen is given by the following equation:

$$d = n.\lambda p + Vp.tp \quad (2)$$

where $\lambda p$ represents the wavelength of the elastic wave and n is an integer.

The integer n may be expressed as follows from Equations (1) and (2):

$$n = int[(Vg.tg - Vp.tp)/\lambda p + 1/N] \quad (3)$$

It should be noted that N is a real number other than "0". Any appropriate value may be used. For example, if N=2 holds, n can be decided when there is fluctuation of tg or the like within ±½ wavelength. By substituting n thus obtained into Equation (2), the difference between the vibration pen 3 and vibration sensor 6a can be measured with greater accuracy.

In actuality, what is measured based upon the signal outputted by the signal detecting circuit 9 is tg' or tp', which incorporates an offset equivalent to the lag time ascribable to the vibration pen or circuitry. Accordingly, when these are substituted into Equation (2) or Equation (3), it is necessary to subtract the offset to arrive at tg, tp. In order to measure these two transmission lag times tg' and tp', signals 45 and 47 are produced by the signal detecting circuit 9. The signal detecting circuit 9 is constructed as shown in FIG. 5.

Figure 5:
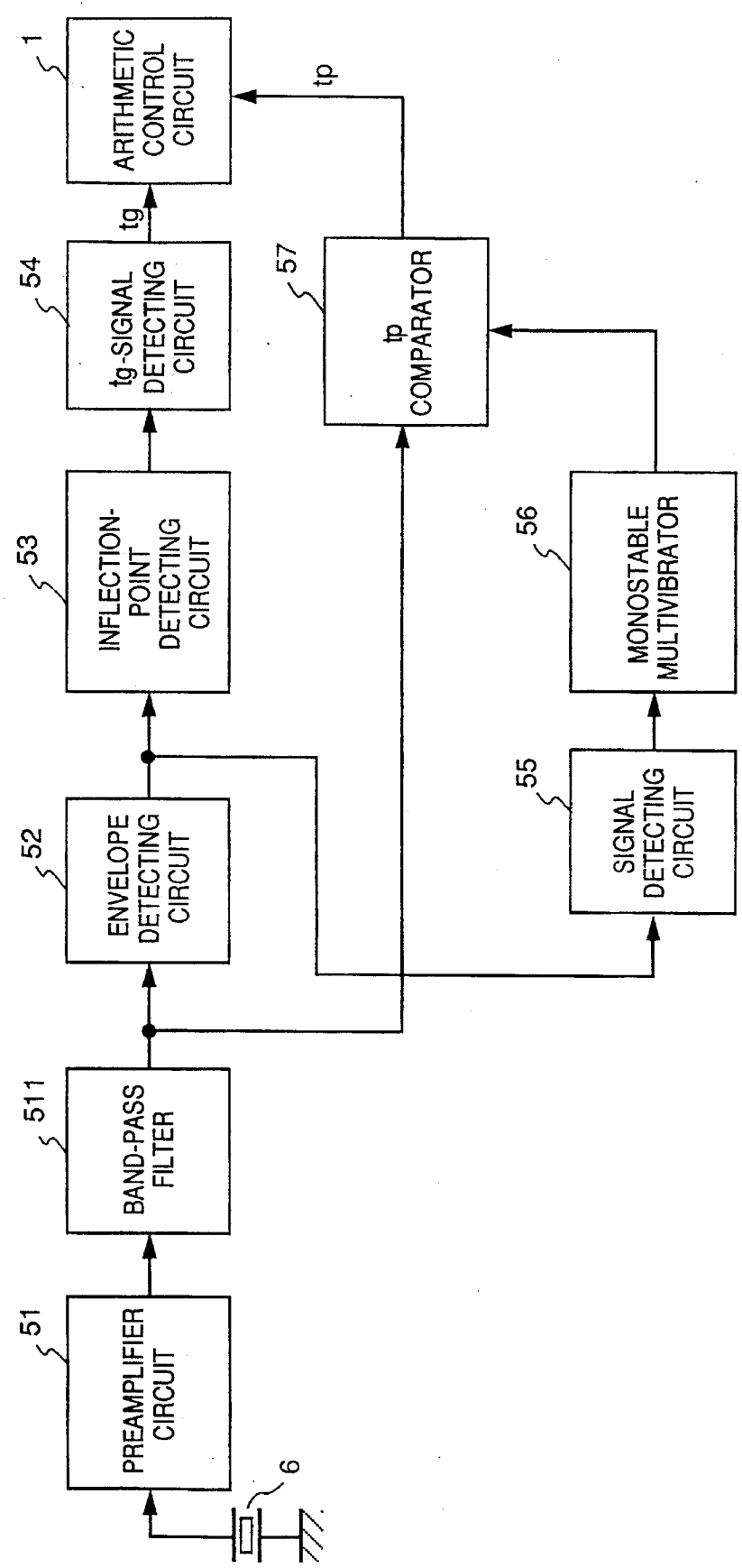
FIG. 5 is a block diagram illustrating the construction of a signal-waveform detecting circuit.

FIG. 5 is a block diagram illustrating the arrangement of the signal detecting circuit 9 according to this embodiment. In FIG. 5, the output signal of the vibration sensor 6 is amplified to a prescribed level by a preamplifier circuit 51. The amplified signal is applied to a band-pass filter 511, which removes unnecessary frequency components from the detection signal. The filtered signal enters an envelope detecting circuit 52, which is composed of an absolute-value circuit and a low-pass filter, etc., whereby only the envelope of the detection signal is extracted. The timing of the inflection point of the envelope is detected by an inflection-point detecting circuit 53. The output of the envelope inflection-point detecting circuits 53 enters a tg signal detecting circuit 54 comprising a monostable multivibrator and the like. The circuit 54 produces the signal tg (signal 45 in FIG. 4), which indicates the lag time of the envelope of the prescribed shape. The signal tg is applied to the arithmetic control circuit 1.

A signal detecting circuit 55 produces a pulse signal for a portion where the envelope signal 43 detected by the envelope detecting circuit 52 exceeds the threshold-value signal 431 of the prescribed level. A monostable multivibrator 56 outputs a gate signal 46 of a prescribed duration triggered by the first leading edge of the pulse signal. A tp comparator 57 detects the zero-cross point of the first leading edge of the phase signal 42 while the gate signal 46 is open, and a signal tp47 indicative of the lag time of the phase is supplied to the arithmetic control circuit 1. It should be noted that the above-described circuit is for the vibration sensor 6a, and that identical circuits are provided for the other vibration sensors as well.

Figure 6:
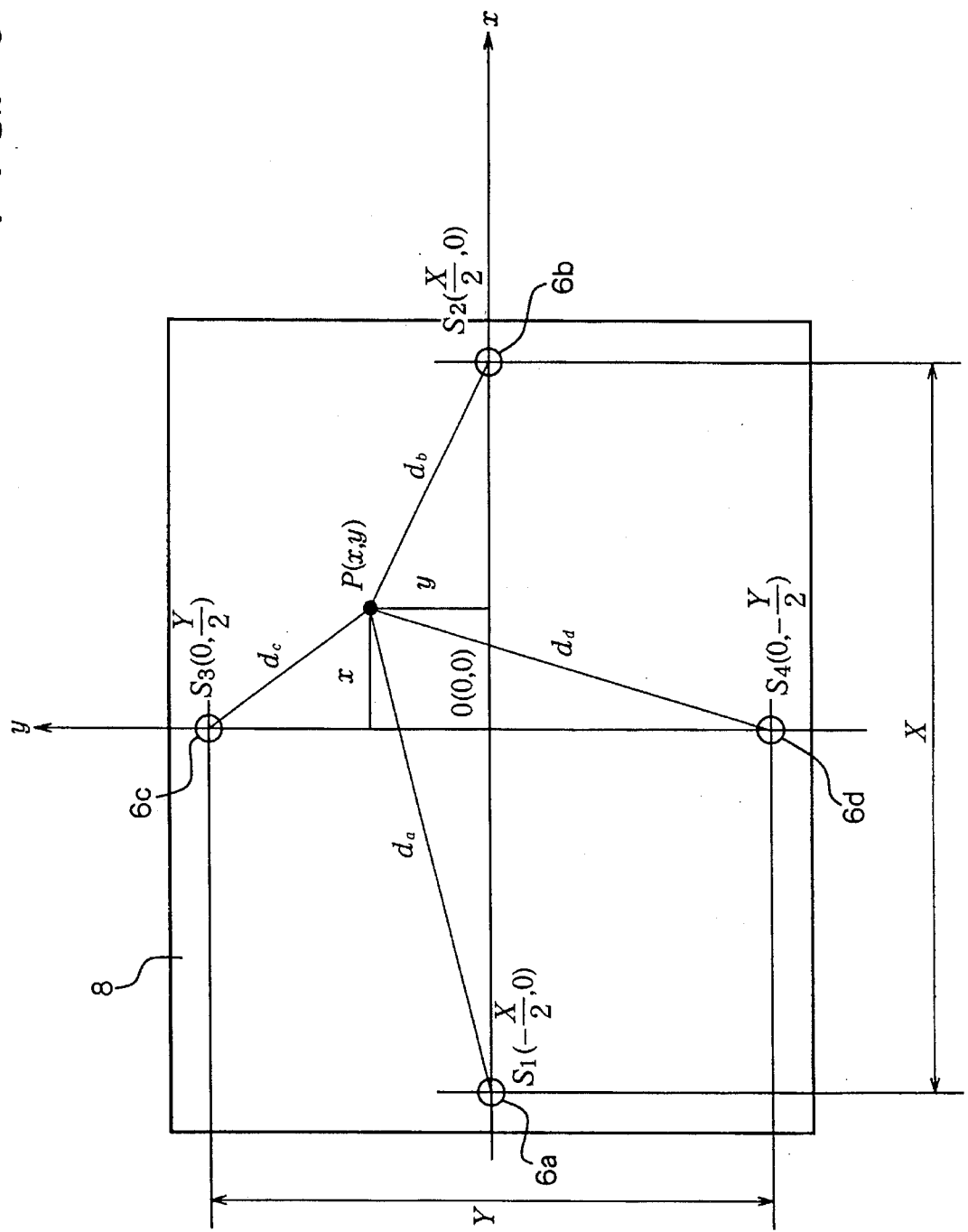
FIG. 6 is a diagram for describing calculation of coordinate position.

<Description of Coordinate Calculation (FIG. 6)>

The principle through which coordinates are actually detected on the vibration transmitting tablet 8 by the vibration pen 3 will now be described.

The four vibration sensors 6a~6d are provided at positions S1~S4, respectively, located in the vicinity of points midway between the four corners of the vibration transmitting tablet 8. When this is done, the straight-line distances da~dd from the position P of the vibration pen 3 to the positions of the vibration sensors 6a~6d, respectively, can be obtained on the basis of the principle described above. On the basis of these straight-line distances da-dd, the arithmetic control circuit 1 is capable of obtaining coordinates (x,y) of the position P of the vibration pen 3 in the following manner using the Pythagorean theorem:

$$x = (da+db).(da-db)/2X \quad (4)$$

$$y = (dc+dd).(dc-dd)/2Y \quad (5)$$

where X, Y represent the distances between the vibration sensors 6a, 6d and between the vibration sensors 6c, 6d, respectively.

Thus, the positional coordinates of the vibration pen 3 can be detected on a real-time basis.

<Description of Differentiating Circuit>

Figure 7A:
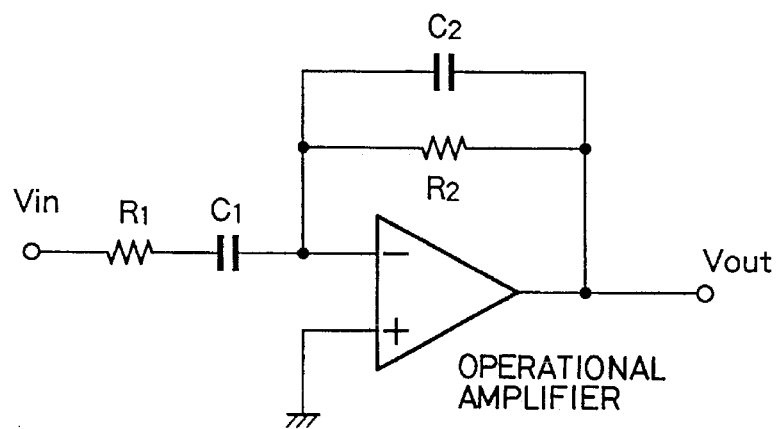
FIGS. 7A and 7B are diagrams for describing the characteristics of a differentiating circuit.
Figure 7B:
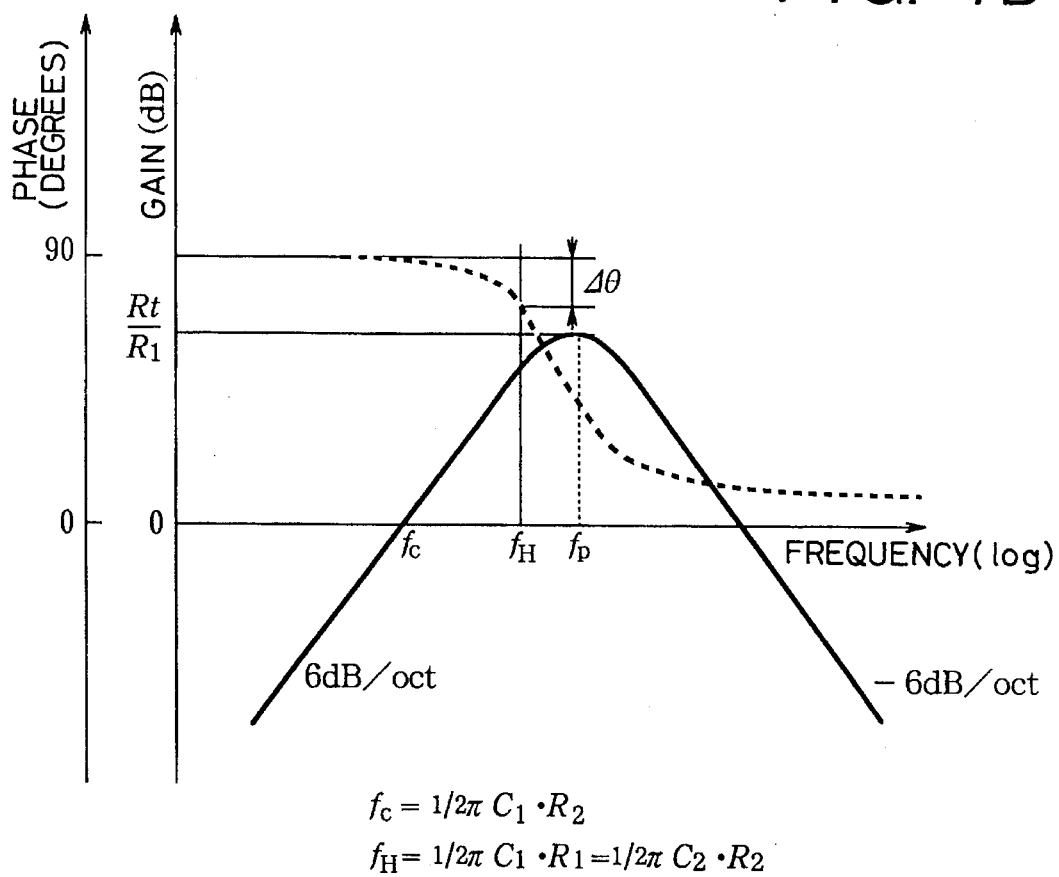

The inflection-point detecting circuit 53 is constructed by serially connecting differentiating circuits in two stages. If the differentiating circuit possesses an ideal input/output differentiation characteristic, the inflection point of the leading edge of the envelope 43 of the detected waveform will correspond accurately to the initial zero-cross point of the differentiated waveform 44 following second order differentiation by virtue of performing differentiation processing two times. A circuit diagram exemplifying a differentiating circuit of one stage and a characteristic diagram illustrating the frequency characteristic of the circuit are illustrated in FIGS. 7A and 7B. A differentiation limit frequency fH and peak gain frequency fp can be set by the resistors and capacitors illustrated.

An actual differentiating circuit exhibits a characteristic different from that of an ideal differentiating circuit, as illustrated in FIG. 7B. The dashed line is a characteristic relating to a phase advance after differentiation. When the frequency (center-frequency component) f of the input signal is close to the differentiation limit frequency fH, the phase of the output signal is less than 90° ($\pi/2$). This represents a departure from the ideal differentiating circuit mentioned above. The fact that the phase advance is small means that the zero-cross point of the differentiated waveform 44 after second-order differentiation corresponds to a part of the input envelope 43 that comes after the inflection point thereof in terms of time. This represents a problem in terms of susceptibility to the effects of reflected waves at the time of detection.

Figure 8A:
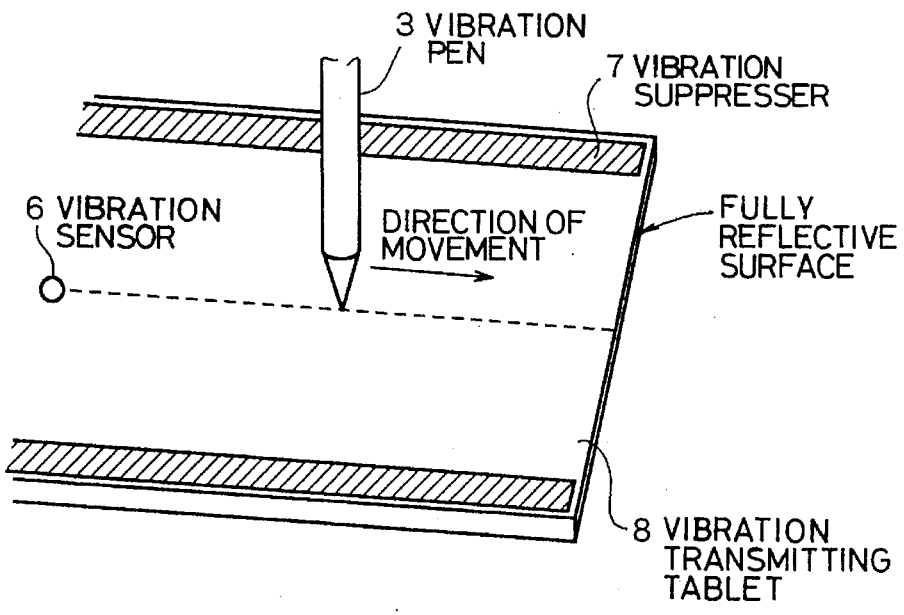
FIGS. 8A and 8B are diagrams for describing a method of evaluating a detection point group lag time tg.
Figure 8B:
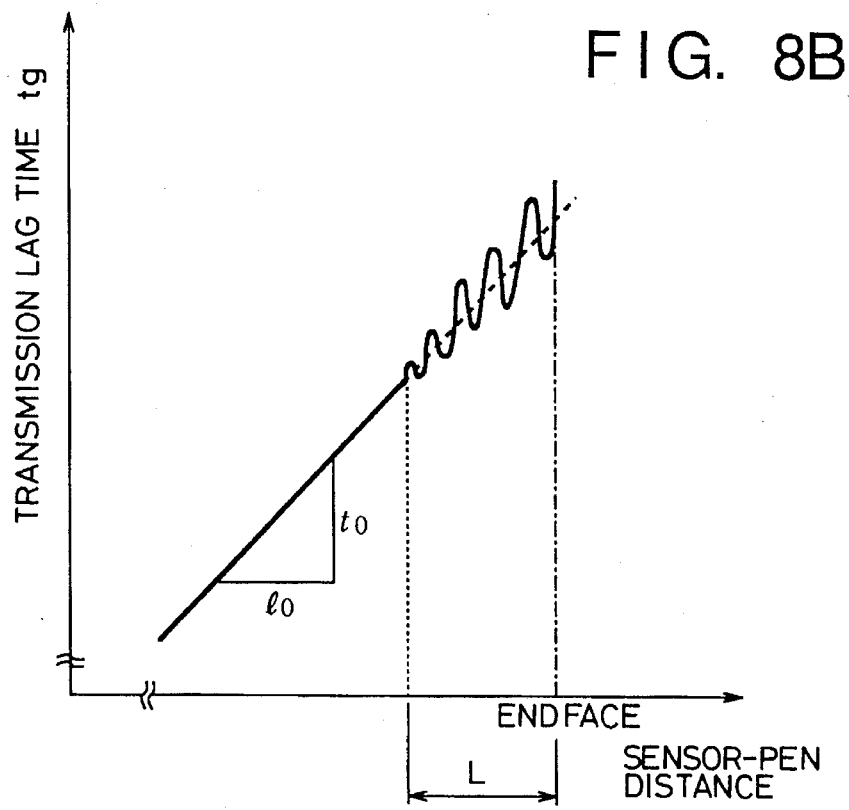

This problem is easy to understand when the manner in which the detection point changes owing to the differential limit frequency fH is evaluated. FIG. 8A is a schematic view illustrating an evaluation tool used to discriminate the detection point. As shown in FIG. 8A, one end face of the vibration transmitting tablet 8 is provided with a fully-reflective surface (the right end face in the drawing) devoid of the vibration suppresser 7. The vibration pen 3 is moved gradually away from an vibration sensor 6 along a line perpendicular to the fully reflective surface. A sensed signal obtained by the vibrator sensor 6 enters the signal detecting circuit 9, whereby the lag time tg is obtained. When the lag time tg obtained is plotted taking traveling distance along the horizontal axis, the graph shown in FIG. 8B is obtained. The graph reveals the position at which the linear relationship breaks down owing to the effects of reflected waves from the fully reflective surface. Let L represent the distance from the pen position, at which the effects of reflection appear, to the fully reflective end face. There is a correlation between the distance L and the tg detection point of the detected signal. Specifically, the shorter the distance L, the more the detection point is shifted forward (closer to the inflection point of the envelope) and the less susceptibility there is to reflected waves. In other words, if the group velocity is Vg(=0/t0), the time required for a reflected wave from the end face to arrive at a point having a distance L from the end face is 2L/V. This time is the period of time from the rise in the detected vibration waveform to the tg detection point. It will be understood that the smaller the value of L, the shorter this time becomes. In other words, in the detected signal, the detection point tg is shifted forward in terms of time.

Figure 9:
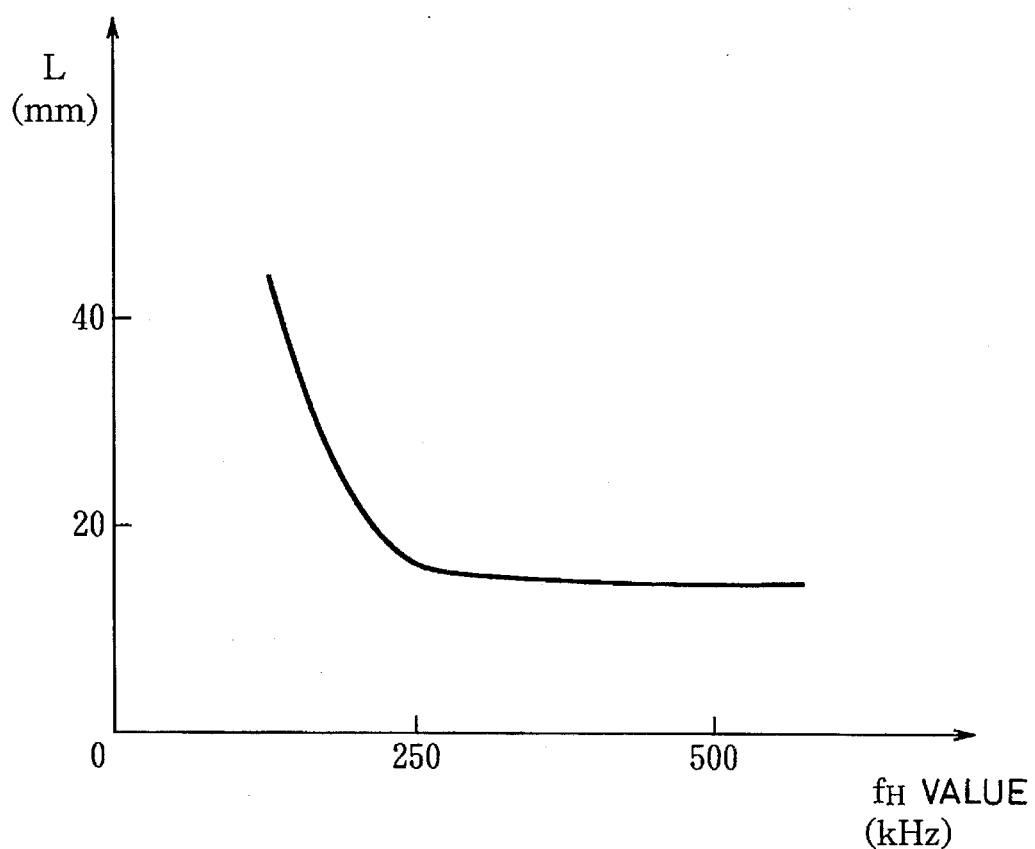
FIG. 9 is a characteristic diagram of tg detection point versus differentiation limit frequency fH.

FIG. 9 illustrates the results of evaluating the distance L, by the evaluation method of FIGS. 8A and 8B, obtained by changing the value of the differentiation limit frequency fh when the center frequency f of the vibration which propagates through the vibration transmitting panel 8 is 500 kHz and the frequency of the rising portion of the envelope is 40 kHz. FIG. 9 reveals that when fH is sufficiently larger than 40 kHz, or more specifically, when fH≧f=500 kHz holds, L is substantially constant.

Though the peak position and inflection point of the detected signal change in a manner that is linearly related to distance in accordance with the group velocity, this does not mean that the inflection point is detected when the transmission phase characteristic of the differentiating circuit shifts from 90° (from 180°, since two stages of differentiating circuits are provided). As a consequence, there is an offset from the slope of the group velocity Vg and a departure from the linear relationship, and the zero-cross point of the differentiated waveform 44 is shifted back and forth along the time axis depending upon the level of the detected signal. As a result, a problem that arises is a decline in coordinate detection accuracy. Another reason for this is that since Vp varies depending upon frequency (this is referred to as variance), the waveform of the overall detected signal changes depending upon propagation distance.

If the value of fH is set to be sufficiently large with respect to the frequency of the envelope, the phase transmission characteristic of the differentiating circuit will approach the ideal and there will be less susceptibility to the effects of reflected waves, as thus far described. Further, problems such as the occurrence of erroneous detection due to a fluctuation in the level of detected waves are eliminated. In actuality, since the same effects are obtained even when the value of fH is such that fH≧f/2=250 KHz holds, as will be understood also from FIG. 9, the foregoing holds up to fH=f/2.

The differentiation limit frequency fH, which is the upper limit of the practical differentiation operation area, occurs in the vicinity of the peak gain frequency fp. Therefore, if the peak gain frequency fp is set to the center frequency f of vibration or to a value greater than the center frequency, then the frequency fe of the envelope will sufficiently satisfy the relation fH>fe with respect to the differentiation limit frequency fH, and the phase advance angle after first order differentiation will not fall greatly below 90°.

However, an additional problem is the characteristic of the envelope detecting circuit 25 in the stage prior to the differentiating circuit. The envelope detecting circuit 52 is constituted by a low-pass filter or band-pass filter. The frequency component (fe) of the envelope of the detected signal 42 is passed without loss (or upon being amplified), frequency components f (center-frequency components of vibration) higher than this frequency component are cut, i.e., passed using a high attenuation factor, and an envelope is obtained as an output. In other words, the transmission characteristics of the envelope frequency fe and center frequency f are merely provided with a difference of α dB. That is, if the difference in the frequency characteristics between the frequencies fe and f in the inflection-point detecting circuit 53 on the succeeding stage is −α dB, then the waveform of the output signal will approach that of the signal inputted to the envelope detecting circuit. More specifically, if the value of the differentiation limit frequency fH is made large in order to optimize the characteristic of the differentiating circuit, the amplitude transmission characteristic of the differentiating circuit at the center frequency f also will become large. It will be necessary, therefore, to enlarge the difference (=α dB) between the amplitude transmission characteristics of fe and f of the envelope detecting circuit 52 of the preceding stage. More specifically, by adopting a higher-order filter as the low-pass filter or band-pass filter constituting the envelope detecting circuit 52, pass loss at a frequency above the cut-off frequency or at a frequency higher than the band is made larger. This makes it possible to enlarge the difference α dB between the amplitude transmission characteristics of the envelop frequency fe and center frequency f in a simple manner.

Accordingly, in this arrangement, it goes without saying that the frequency fc of the unity gain (amplification factor=0 dB) of the differentiating circuit should be set so as to obtain the necessary output amplitude.

Thus, as described above, by making the peak gain frequency fp equal to or larger than the center frequency of the sensed vibration, the differentiation limit frequency fH of the differentiating circuit constituting the inflection-point detecting circuit 53 is made equal to or less than the center frequency (fH≧f). Furthermore, by adopting a high-order low-pass filter or band-pass filter to construct the envelope detecting circuit, the group lag time of the propagated vibration can be detected without being influenced by reflected waves. In addition, erroneous detection due to a fluctuation in detection level is eliminated.

The present invention can be applied to a system constituted by a plurality of devices or to an apparatus comprising a single device. Furthermore, it goes without saying that the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. A coordinate input apparatus, comprising:

a tablet for transmitting vibration;

a vibration pen for applying vibration to said tablet;

a plurality of vibration sensing means for sensing vibration transmitted by said tablet;

generating means for generating an envelope signal based on the vibration sensed by said vibration sensing means;

detecting means having a differentiating circuit for detecting a specific point in the envelope signal, wherein said differentiating circuit adopts a frequency the same as or higher than that of the vibration applied by said vibration pen as peak gain frequency, differentiates the envelope signal at least one time and obtains a first zero-cross point which serves as the specific point;

measuring means for measuring time from the application of the vibration from said vibration pen to said tablet to the detection of the specific point by said detecting means; and calculating means for calculating a distance between said vibration pen and said vibration sensing means based on the time measured by said measuring means, and for calculating a coordinate of a position of said vibration pen on said tablet based upon the calculated distance.

2. The apparatus according to claim 1, wherein said generating means has a higher-order frequency filter for enlarging pass loss of a frequency higher than a cut-off frequency in order to enlarge the difference between amplitude transmission characteristics of a frequency of the envelope signal and a center frequency, and to prevent said differentiating circuit from outputting a signal having same waveform as the signal sensed by said vibration sensing means.

3. The apparatus according to claim 1, wherein said detecting means detects an inflection point of said envelope as the specific point by differentiating the envelope signal twice.

4. The apparatus according to claim 1, wherein said vibration pen generates vibration at a prescribed period in synchronism with said vibration sensing means.

5. The apparatus according to claim 1, further comprising display means for displaying an image, wherein said vibration transmitting means includes a transparent plate, said display means being provided beneath said transparent plate.

6. The apparatus according to claim 5, wherein a plurality of said vibration sensing means are provided at mutually different positions on said transparent plate.

7. The apparatus according to claim 1, wherein said detecting means detects a peak point of the envelope signal as the specific point by differentiating the envelope signal once.

8. The apparatus according to claim 7, wherein said generating means has a higher-order frequency filter for enlarging pass loss of a frequency higher than a cut-off frequency in order to enlarge the difference between amplitude transmission characteristics of a frequency of the envelope signal and a center frequency, and to prevent said differentiating circuit from outputting a signal having the same waveform as the signal sensed by said vibration sensing means.

9. The apparatus according to claim 7, wherein said vibration pen generates vibration at a prescribed period in synchronism with said vibration sensing means.

10. The apparatus according to claim 7, further comprising display means for displaying an image, wherein said vibration transmitting means includes a transparent plate, said display means being provided beneath said transparent plate.

11. The apparatus according to claim 10, wherein a plurality of said vibration sensing means are provided at mutually different positions on said transparent plate.

12. A coordinate input apparatus comprising:

a tablet for transmitting vibration;

a vibration pen for applying vibration to said tablet;

a plurality of vibration sensing means for sensing vibration transmitted by said tablet;

generating means for generating an envelope signal based on the vibration sensed by said vibration sensing means;

detecting means having two serially-connected differentiating circuits for detecting an inflection point in the envelope signal, wherein said two serially-connected differentiating circuits adopt a frequency the same as or higher than that of the vibration applied by said vibration pen as peak gain frequency, differentiate the envelope signal, and obtain a first zero-cross point which serves as the inflection point;

measuring means for measuring time from the application of the vibration from said vibration pen to said tablet to the detection of the specific point by said detecting means; and calculating means for calculating a distance between said vibration pen and said sensing means based on the time measured by said measuring means, and calculating a coordinate of a position of said vibration pen in said tablet based upon the calculated distance.

13. A coordinate input apparatus comprising:

a tablet for transmitting vibration;

a vibration pen for applying vibration to said tablet;

a plurality of vibration sensing means for sensing vibration transmitted by said tablet;

generating means for generating an envelope signal based on the vibration sensed by said vibration sensing means;

detecting means having two serially-connected differentiating circuits for detecting an inflection point in the envelope signal, wherein said two serially-connected differentiating circuits adopt a frequency the same as or higher than that of the vibration applied by said vibration pen as peak gain frequency, differentiate said envelope signal, and obtain a first zero-cross point which serves as the inflection point;

measuring means for measuring time from the application of the vibration from said vibration pen to said tablet to the detection of the inflection point by said detecting means; and calculating means for calculating a distance between said vibration pen and said sensing means based on the time measured by said measuring means, and a coordinate of a position of said vibration pen in said tablet based upon the calculated distance, wherein said generating means has a higher-order frequency filter for enlarging pass loss of a frequency higher than a cut-off frequency in order to enlarge the difference between the amplitude transmission characteristics of a frequency of the envelope signal and a center frequency, and to prevent said differentiating circuits from outputting a signal having the same waveform as the signal sensed by said vibration sensing means.

* * * * *

UNITED STATES PATENT AND TRADEMARK OFFICE
CERTIFICATE OF CORRECTION

PATENT NO. : 5,570,299
DATED : October 29, 1996
INVENTOR(S) : Tokioka et al.

It is certified that error appears in the above-indentified patent and that said Letters Patent is hereby corrected as shown below:

ON THE TITLE PAGE:
[56] REFERENCES CITED:

```
FOREIGN PATENT DOCUMENTS,  "1236320  9/1989  Japan
                            2130612  5/1990  Japan
                            2130614  5/1990  Japan
                            2130616  5/1990  Japan
                            2125322  5/1990  Japan"
         should read  --1-236320  9/1989  Japan
                       2-130612   5/1990  Japan
                       2-130614   5/1990  Japan
                       2-130616   5/1990  Japan
                       2-125322   5/1990  Japan--.
```

Signed and Sealed this

Thirteenth Day of May, 1997

Attest:

BRUCE LEHMAN

*Attesting Officer*    *Commissioner of Patents and Trademarks*